Dec. 12, 1950 N. L. COHEN 2,534,106

SERVO MECHANISM

Filed March 2, 1946 2 Sheets-Sheet 1

INVENTOR.
NATHANIEL L. COHEN

BY Ostrolenk + Faber

ATTORNEYS

Dec. 12, 1950 N. L. COHEN 2,534,106

SERVO MECHANISM

Filed March 2, 1946 2 Sheets-Sheet 2

INVENTOR.
NATHANIEL L. COHEN
BY
Ostrolenk + Faber
ATTORNEYS

Patented Dec. 12, 1950

2,534,106

UNITED STATES PATENT OFFICE 2,534,106

SERVO MECHANISM

Nathaniel L. Cohen, Rockaway Beach, N. Y.

Application March 2, 1946, Serial No. 651,668

7 Claims. (Cl. 318—24)

My invention relates to a system for transmitting signals from a self-synchronous transmitter to one or more self-synchronous repeaters over less than the usual number of wires, and more particularly to a unique way I have discovered of accomplishing this desired result.

Attempts have been made in the past to transmit signals for the control of self-synchronous repeaters or similar devices over less than three conductors. One such scheme was proposed in which the angular position of the transmitter determined the output frequency of a variable frequency audio oscillator. This audio frequency signal was used to control the position of a repeater at the remote point.

The greatest disadvantage of this system is the fact that complete and continuous rotation of the repeater is not possible.

A second system which was described recently involved a series of ultra high frequency transmitters, with antenna systems arranged in space-time angular displacement. The system involved a great deal of cumbersome equipment, and was workable over only relatively short ranges.

I have discovered a means whereby signals for the direct control of a self-synchronous repeater system over very great distances are readily transmitted over only two wires or by radio, permitting continuous control for all angles of rotation of the transmitter. My system utilizes a unique combination of carrier and sub-carrier signals to accomplish the desired result.

It is therefore an object of my invention to provide long distance remote control of a self-synchronous repeater system.

It is a further object of my invention to provide a system for transmitting signals for the control of a self-synchronous repeater over a circuit having only two conductors.

Still another object of my invention is to provide continuous angular control of a self-synchronous repeater at remote locations.

These and other objects of my invention will become apparent from the following description and the accompanying drawings in which Figure 1 shows a standard self-synchronous repeater system utilizing a self-synchronous transmitter and a self-synchronous motor.

Throughout this discussion, the term "transmitter" will indicate a self-synchronous transmitter or generator, a device for converting the angular motion or position of its rotor into a unique combination of electrical signals. In addition, the term "repeater" will indicate a self-synchronous repeater, motor, control transformer or other self-synchronous machine, devices for converting electrical signals from a transmitter into angular motion or position of their rotors corresponding to the motion or position of the transmitter rotor. The term "repeater," unless otherwise qualified, is used generically to indicate a device which can either be a transmitter or self-synchronous motor or control transformer, as they are machines having electro-mechanical symmetry.

In order to describe my invention, I will review the general principles of operation of a self-synchronous repeater system. The self-synchronous repeater is a machine similar to a wound rotor three-phase motor or generator. It consists of a rotor, mounted with suitable bearings, having a coil of wire mounted thereon, and a stator having three similar coils equally displaced about the axis of the rotor, so that the axis of an electric field induced therein is displaced 120° from the adjacent coil axes.

Figure 6:
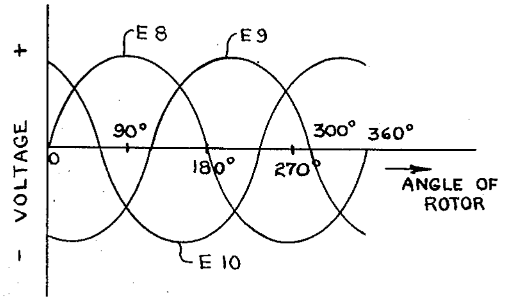
Figure 6 represents the voltage distribution as a function of rotor angle in a self-synchronous machine.

When coil 2 on the rotor of machine 5 is excited, the voltage in the various coils on the stator depends upon the angular position of the rotor. The variation of voltage induced in each of the stator coils as a function of the position of the rotor is shown in Figure 6. It is to be noted that the combination of the three voltages and their slopes or derivatives is unique. That means that a repeater excited from the same source and connected to the first machine will have the same voltages induced for the same position of its rotor, and only for that position.

Figure 1:
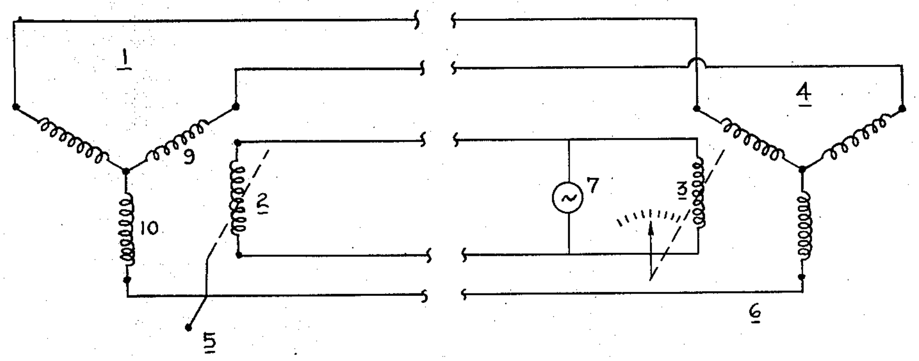

In operation as a torque transmission system, the transmitter and repeater are connected as shown in Figure 1. In Figure 1 I have shown schematically a transmitter 5, comprising rotor 2 and stator coils 8, 9 and 10 of stator 1; a repeater 6, comprising rotor 3 and stator coils of stator 4; alternating current power source 7, and wires connecting both transmitter and repeater together and to the power source.

Assuming that rotors 2 and 3 are in the same angular position with respect to their own stators, when power source 7 is connected, voltages induced in coils 8, 9 and 10 by the action of coil 2 will be identical with those induced in the corresponding coils of stator 4 due to the action of coil 3. Under these conditions, no current will flow in the stator windings, and hence no torque will develop tending to rotate either rotor.

If, however, coil 2 is now rotated through a small angle, it will have a different angular position with respect to its stator 1 than coil 3 will have with respect to stator 4. Consequently, voltage differences will appear between the corresponding terminals of stator 1 and stator 4, and currents will flow. These currents will be in such a direction and of such a magnitude that a torque, due to the interaction of the rotor and stator fields, will be developed tending to turn rotor 3 to the same relative position as that of rotor 2. Similarly a torque will develop tending to turn rotor 2 back to its original position, but it is assumed that the mechanism which caused rotor 2 to turn originally resists this torque.

It is, of course, apparent that either 5 or 6 can act as the transmitter, and hence the system is bilateral; i. e., either end will respond to action at the other. It may be observed that the voltage differences between the respective terminals of the two stators is unique for each angular difference between the rotors, and hence no ambiguity of position can obtain. Although only one repeater is shown in Figure 1, any number of additional repeaters may be added to the system.

My invention contemplates a unilateral arrangement whereby one self-synchronous machine is designated the transmitter, and all other machines connected to the system act as repeaters having no return effect on the transmitter. It is possible, however, by using a multiple arrangement of the devices, to make the system bilateral.

It is now apparent that the transmission of three related voltages from one machine, say the transmitter, to the other machine, the repeater, is essential to the operation of the system. It is also apparent that their relative magnitudes and phase must be maintained during transmission. The three voltages are naturally in phase at the transmitter, but it is clear that if transmitted over a long line, differences in the line might cause a phase shift on one voltage and not the others. This would, of course, result in a distorted magnetic field pattern in the machine with resultant inaccuracies.

I have discovered, however, a method of preserving the relative amplitude and phase of a plurality of voltages no matter what distance they are transmitted over. I have found that if two related voltages are used to modulate two separate carrier waves of different frequency, and if these carrier waves are transmitted over a line, that the phase relation of the two original voltages when detected at the receiving end of the line will be the same as at the sending end provided that the two carrier waves are synchronized, so that they will not be altered in phase.

In particular I have found that if one of the carrier waves is harmonically related to the other, then they will maintain the same relative phase provided that the higher frequency is synchronized from the lower frequency. I apply these principles in a novel way in my invention.

Figure 2:
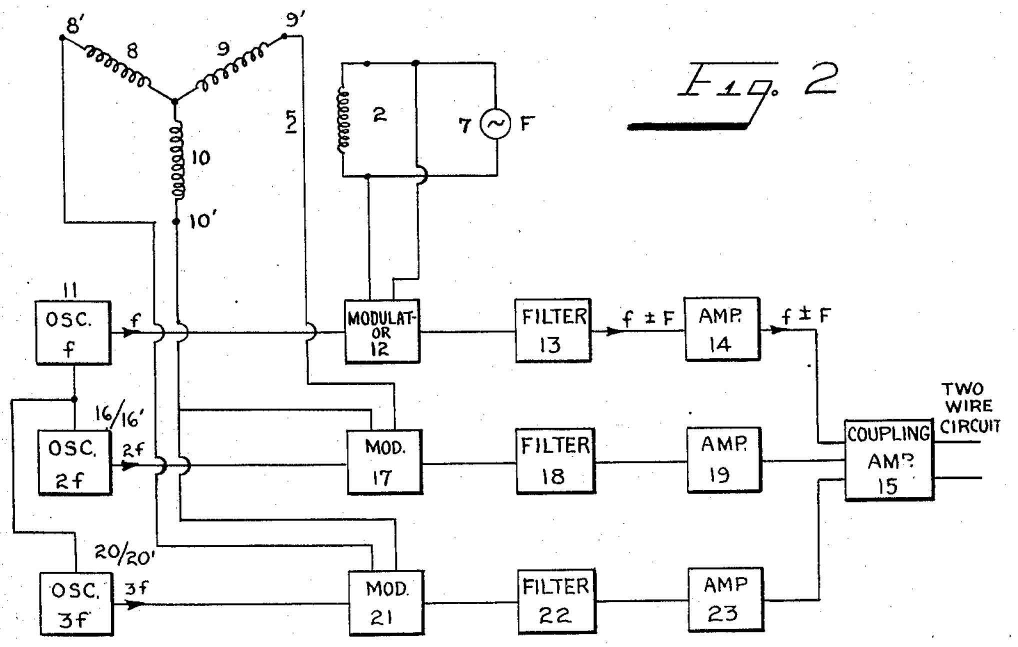
Figure 2 shows a block diagram of one part of my invention, namely, that portion connected to the self-synchronous transmitter.

In Figure 2 I have shown a transmitter 5 connected to a system of electrical transducers in which 11, 16 and 20 are carrier oscillators of frequency $f$, $2f$ and $3f$, respectively; 12, 17 and 21 are identical mixers or modulators as, for example, ring modulators; 13, 18 and 22 are filters; 14, 19 and 23 are amplifiers, and 15 is an ordinary mixing amplifier which combines the signals from amplifiers 14, 19 and 23 and feeds into a two-wire line.

Power source 7 supplies a voltage of frequency F to coil 2 of the rotor. In addition, it supplies this same voltage to modulator 12. The voltage impressed on coil 2 induces, by transformer action, voltages in coils 8, 9 and 10. These voltages are in unique combination such that their sum around the loop consisting of coils 8, 9 and 10 is zero, the voltage induced in each coil being a function of the angular position of the rotor 2. The voltages induced in coils, and appearing at terminals 9′—10′ and 10′—8′, are fed to modulators 17 and 21 respectively.

Oscillator 11 supplies a voltage of frequency $f$ to modulator 12 which combines it with the voltage from coil 2 to form a modulated carrier wave of frequency $f$, having two sidebands of frequency $f+F$ and $f-F$, displaced from the carrier by the frequency of power source 7, one being higher and one being lower in frequency, in addition to spurious frequencies.

Filter 13 accepts the carrier and principal sidebands, rejecting all spurious frequencies, and passes them to amplifier 14. Amplifier 14 amplifies the signal and feeds it to amplifier 15 which feeds it to the two wire line.

Similarly, oscillator 16, modulator 17, filter 18 and amplifier 19 accomplish the same function utilizing as a modulating voltage that from coil 10, except that the carrier frequency is $2f$ and the sidebands are of frequency $2f+F$ and $2f-F$. And in the same manner the voltage from coil 8 is applied as modulation to the carrier from oscillator 20, which has a frequency $3f$ with sidebands of frequency $3f+F$ and $3f-F$, through the medium of modulator 21, filter 22 and amplifier 23.

It is noted that only two of the three voltages developed around the stator are utilized. This is sufficient for the third is necessarily equal to the vector sum of the other two. Hence, if these voltages are detected elsewhere in the system, the third voltage is synthesized by vectorially adding the two known voltages.

It is known by those skilled in the art that two voltages of different frequency when applied to a carrier voltage as modulation retain their same relative time positions in the modulation envelope. Similarly, I have discovered that two or more voltages of the same or different frequency when applied to a corresponding number of carrier waves retain their relative time or phase positions and magnitudes on the modulation envelopes, provided that the carrier voltages are mutually synchronized.

In Figure 2 I have shown oscillators 11, 16 and 20 connected together for the purposes of synchronization, and have described above that they are mutually synchronized, thereby fulfilling the requirements for the carrier envelopes to maintain the same relationship as the modulating voltages.

Since it is possible to operate this system with only one oscillator, I have shown in Figure 2 an arrangement where I replace oscillators 16 and 20 with frequency multipliers 16′ and 20′ having output frequencies of $2f$ and $3f$, respectively, and output voltages equal to that of oscillator 11, and operated from oscillator 11 as the driving source. In all other respects the operation of my invention as embodied in this change is identical with that described above.

Figure 4:
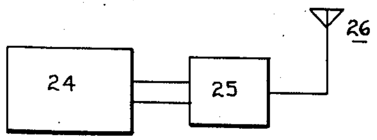
Figure 4 shows a block diagram of the first part of my invention connected to a radio transmitting system.

In Figure 4 I have shown the first part of my invention connected to a radio transmitting system. Numeral 24 represents all the elements described above and shown in Figure 2. Numeral 25 is a radio transmitter of any ordinary type such as AM, PM, FM or TM modulated by the output of 24; and 26 represents an antenna device of any ordinary type.

Therefore, I have shown a means of converting signals from a self-synchronous transmitter into signals capable of being transmitted over a two wire line or a radio circuit without mutual interference between the various components thereof.

Figure 3:
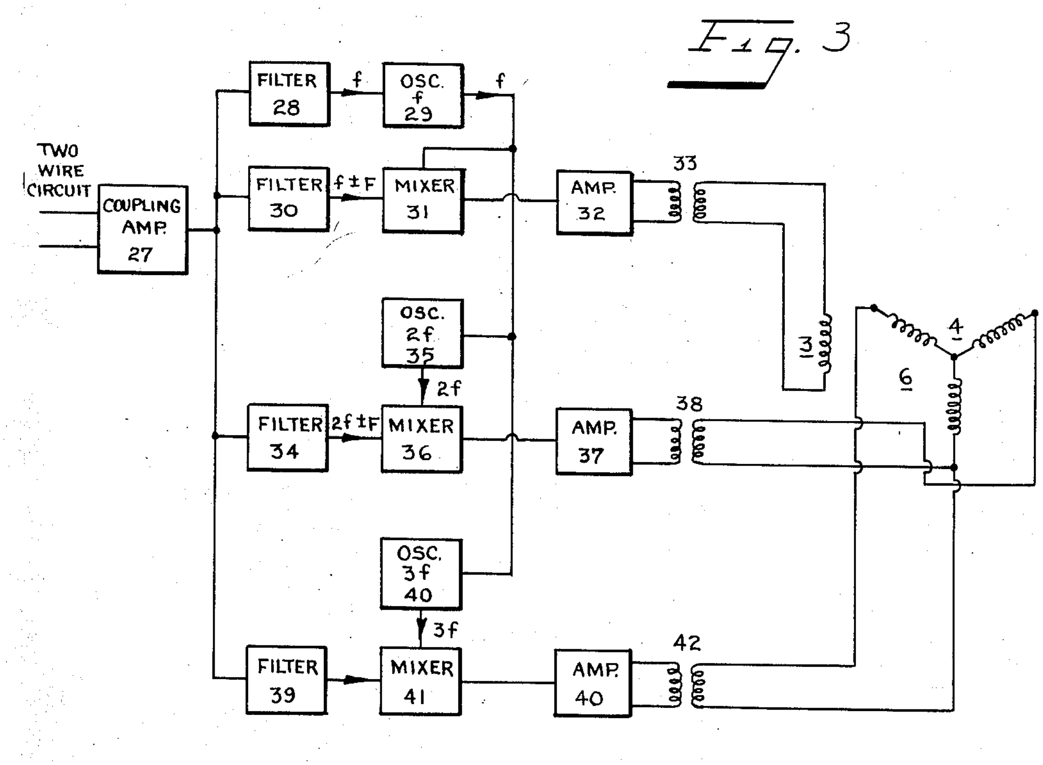
Figure 3 shows a block diagram of another part of my invention, namely, that portion connected to the self-synchronous receiver or repeater.

In Figure 3 I have shown a two wire line connected to a coupling amplifier 27 connected through filters 28, 30, 34 and 39 to oscillator 29 and demodulators 31, 35, 36 and 41, which are in turn connected to amplifiers 32, 37 and 40. These amplifiers are connected to self-synchronous repeater 6 through isolating transformers 33, 38 and 42. Oscillator 29 is connected to oscillators 35 and 40 providing a synchronizing signal to them.

Signals coming on the two wire line from amplifier 15 of Figure 2, located at the remote control point, are received and amplified by amplifier 27 which feeds them to the filters. Filter 28 is an ordinary resonant filter circuit which passes only the fundamental carrier frequency $f$, rejecting all others. The output of this filter is supplied to oscillator 29 as a synchronizing signal. Filter 30 is an ordinary band pass filter which passes the fundamental carrier frequency $f$ and its principal sidebands $f+F$ and $f-F$, rejecting all others.

These signals are fed from the output of 30 to demodulator or mixer 31. Demodulator 31 in turn demodulates this signal, utilizing the signal of frequency $f$ from oscillator 29 as the necessary demodulating voltage. The output of 31 is then a voltage of the same frequency as the original power frequency F from power source 7 in Figure 2. This is amplified in amplifier 32, which is an ordinary amplifier, and fed through transformer 33, which serves to isolate the circuits of amplifier 32, to winding 3, the rotor of self-synchronous repeater 6.

In a similar manner, filter 34 passes only the carrier frequency $2f$ and its principal sidebands $2f\pm F$ to the demodulator 36 which, operating in conjunction with oscillator 35 of frequency $2f$, produces a voltage of frequency F which is amplified in amplifier 37 and fed to one of the windings of the stator of repeater 6.

Tracing back through the circuit of Figure 2 reveals that this voltage is of the same frequency and proportional to the voltage developed in winding 10 of the stator of transmitter 5. Similarly, filter 39, oscillator 40 and demodulator 41 cooperate to produce at the output of amplifier 40 a voltage proportional to the voltage of winding 8 of stator of transmitter 5. Since, as described previously, the phase relationships and relative magnitude of the voltages from the several windings of transmitter 5 were preserved on the several carrier signals, and since all of the demodulating signals from the local oscillators 29, 35 and 40 are synchronized, it follows that the output of each demodulator and hence the output of the corresponding amplifiers has the same relative phase and magnitude, one voltage with respect to the other, as the original signal from transmitter 5.

These voltages applied to the corresponding coils of repeater 6 will then cause the rotor of 6 to take up the same relative position as the rotor of transmitter 5. As mentioned in the above description, oscillator 29 is synchronized from the incoming carrier signal from oscillator 11 of Figure 2. This prevents "hunting" which would occur due to a general shifting in phase between the incoming carrier signals and the local oscillator signals. In a similar manner to that described in connection with frequency multipliers 16′ and 20′ of Figure 2, oscillators 35 and 40 may be replaced by the appropriate frequency multipliers, and oscillator 29 may be replaced by a tuned amplifier of frequency $f$.

Figure 5:
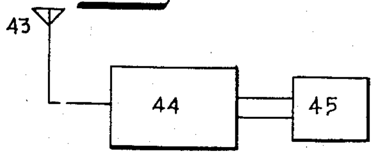
Figure 5 shows a block diagram of the second part of my invention connected to a radio receiving system.

In Figure 5 I have shown the second part of my invention connected to a radio receiving system in which 43 is an antenna system of any type, adjusted to receive signals transmitted by the system shown in Figure 4, and 44 is a radio receiving system connected to 43, and feeding 45 which represents all the elements embodied in Figure 3.

Therefore, I have shown means by which certain signals received on a two wire line or a radio system are utilized to operate a self-synchronous repeater, in correspondence with signals transmitted by a self-synchronous transmitter.

I have described my invention in terms of a self-synchronous torque transmission system. It is of course equally applicable to use with such devices as self-synchronous control transformers, differential self-synchronous motors, or other similar devices.

Since other applications of the principles embodied in my invention will be apparent to those skilled in the art, I prefer to have it described by the following claims.

I claim:

1. In a signalling system, a self-synchronous transmitter comprising a rotor winding and a plurality of stator windings, a source of single phase electric power connected to said rotor winding, said stator windings being so positioned with respect to said rotor that in-phase voltages are induced therein of intensities unique for each relative angular position of said rotor winding with respect to each of said stator windings, a source of carrier current, means for modulating said carrier current by said single phase electric power, a self-synchronous receiver remotely disposed with respect to said transmitter, said receiver comprising a corresponding rotor winding and a corresponding plurality of stator windings, a single carrier transmission channel connecting said transmitter and receiver, means for transmitting said modulated carrier current over said channel and means at said receiver responsive to said modulated carrier current for energizing said stator winding of said receiver corresponding to the energization of said stator winding at said transmitter for effecting a corresponding rotation thereof.

2. In a servo mechanism system, a self-synchronous transmitter comprising a rotor winding and a plurality of stator windings angularly disposed with respect to each other, a correspondingly constructed synchronous receiver, means for energizing said transmitter rotor from a source of alternating current, said stator windings having induced in each winding in-phase voltages of intensities corresponding to the angular position of the winding with respect to the rotor, means comprising a single carrier transmitting channel, a source of carrier currents, means for modulating said source of carrier currents by not more than one less than the total number of stator windings, means for transmitting said modulated carrier currents over said single transmitting channel, and means whereby the rotor of said receiver is energized by signals of the same frequency as, and in phase with, said source of alternating current for energizing said transmitter rotor and means for energizing said receiver stator windings by said transmitted in-phase signal voltages of intensities corresponding to those in said transmitter stator windings for positioning said receiver rotor windings in a position corresponding to said transmitter winding.

3. In a servo system, a self-synchronous rotary transmitter and receiver, means for energizing said transmitter from a source of alternating current, means including said transmitter for generating a plurality of voltages of intensities determined by the angular movement of said transmitter, a source of carrier currents, means for modulating said source of carrier currents in accordance with the source of alternating current and in accordance with the generated voltages, a single carrier transmission channel for transmitting said modulated signals to said receiver, means at said receiver for demodulating said signals to reproduce signals corresponding to said source of alternating current, and to said induced voltages, means for energizing said receiver by said demodulated reproduced alternating current and induced voltages for operating said receiver to a position corresponding to said transmitter.

4. In a servo system, a rotatable transmitter and receiver, means for energizing said transmitter from a source of alternating current, means for generating a plurality of voltages of intensities dependent on the angular position of said transmitter, a plurality of sources of synchronized carrier currents, means for modulating one of said sources with said source of alternating current and for modulating said other sources with individual ones of said generated voltages, a single carrier common transmission channel from said transmitter to said receiver for all of said modulated signals, means at said receiver for separating said plurality of carrier currents, means for demodulating said carrier currents to reproduce signals corresponding to said alternating current for energizing said receiver and to reproduce signals corresponding to said induced voltages to rotate said receiver to a position corresponding to the rotated position of said transmitter.

5. In a servo system, a transmitter and a receiver, a plurality of synchronized carrier frequencies, means for energizing said transmitter from a source of alternating current, means for modulating one of said carrier frequencies with said source of alternating current, a single carrier transmission channel between said transmitter and receiver, means at said receiver for filtering out, demodulating and energizing said receiver by said demodulated signals corresponding to said source of alternating current, means for modulating other of said carrier frequencies by voltages of intensities in accordance with the angular position of said transmitter, means for transmitting said last mentioned signals over said channel, means at said receiver for filtering out each of said other carriers, demodulating said signals and energizing said receiver by said last mentioned demodulated signals corresponding to said voltages to operate said receiver to a position corresponding to the angular rotation of said transmitter.

6. In a servo system, a movable transmitter and a movable receiver, a single transmission channel connecting said movable transmitter and movable receiver, means at said transmitter for generating a plurality of in-phase voltages, each of an intensity associated with the angular position of said movable transmitter, means comprising a second plurality of synchronized voltages for simultaneously transmitting signals over said channel corresponding to not more than one less than said plurality of variable intensity voltages and for transmitting over said channel said synchronizing voltages, and means at said receiver for segregating signals corresponding to said plurality of voltages and for operating said receiver in accordance therewith to a position corresponding to the movement of said transmitter.

7. In a servo system comprising a movable transmitter and a movable receiver, a single carrier circuit connection therebetween, means for energizing said transmitter from a source of power, means for transmitting signals over said circuit corresponding to said source of power for energizing said receiver correspondingly, means for generating in-phase voltages at said transmitter of intensities corresponding to the movement of said transmitter, means for transmitting signals corresponding to said voltage intensities over said circuit, means for segregating said signals from each other and said first mentioned signals at said receiver and means for operating said receiver in accordance with said received signals corresponding to said voltage intensities at said transmitter for moving said receiver in accordance with the movement of said transmitter.

NATHANIEL L. COHEN.

REFERENCES CITED

The following references are of record in the file of this patent:

UNITED STATES PATENTS

| Number | Name | Date |
|---|---|---|
| 1,234,170 | Johnson | July 24, 1917 |
| 1,576,195 | Junken | Mar. 9, 1926 |
| 1,941,615 | Mirick | Jan. 2, 1934 |
| 2,183,725 | Seeley | Dec. 19, 1939 |
| 2,256,482 | Isbister et al. | Sept. 23, 1941 |
| 2,256,487 | Moseley et al. | Sept. 23, 1941 |
| 2,462,117 | Mikkelson et al. | Feb. 22, 1949 |